April 23, 1940.  J. H. WIGGINS  2,198,324
TEMPERATURE DETERMINING APPARATUS AND SAMPLER FOR LIQUID CONTAINERS
Filed March 12, 1938  2 Sheets-Sheet 1
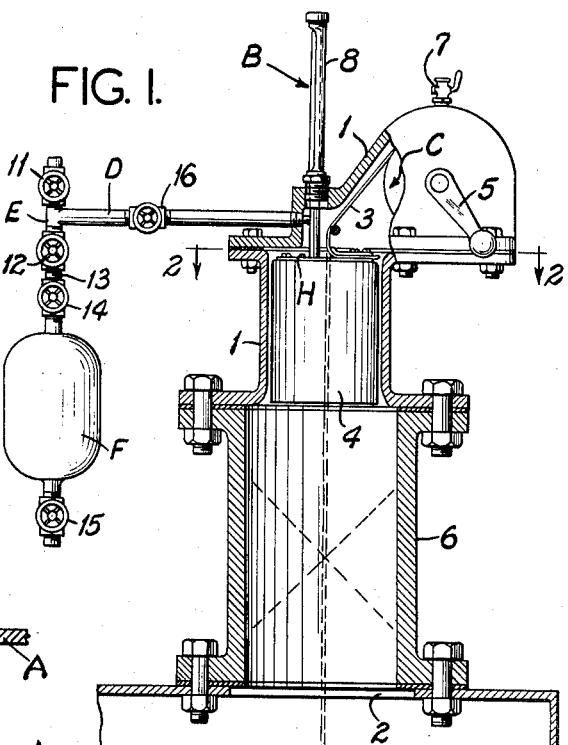
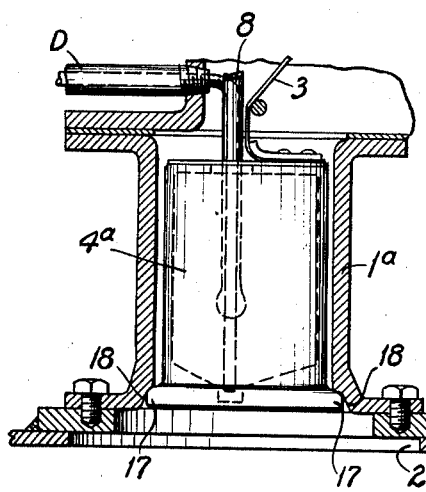
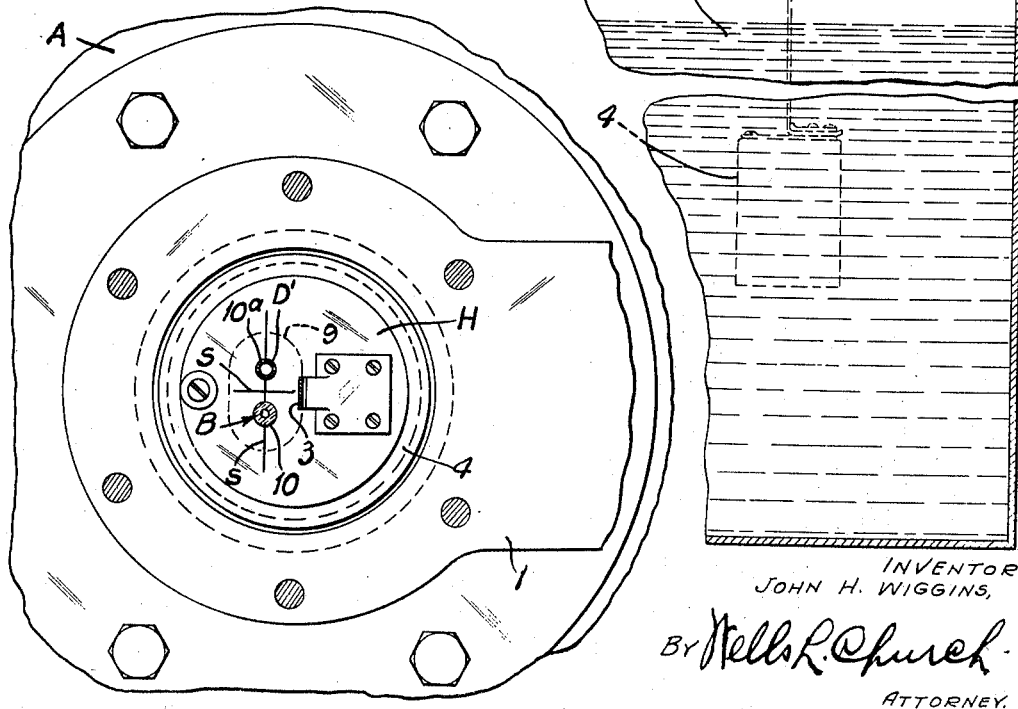
INVENTOR.
JOHN H. WIGGINS,
By Wells R. Church
ATTORNEY.

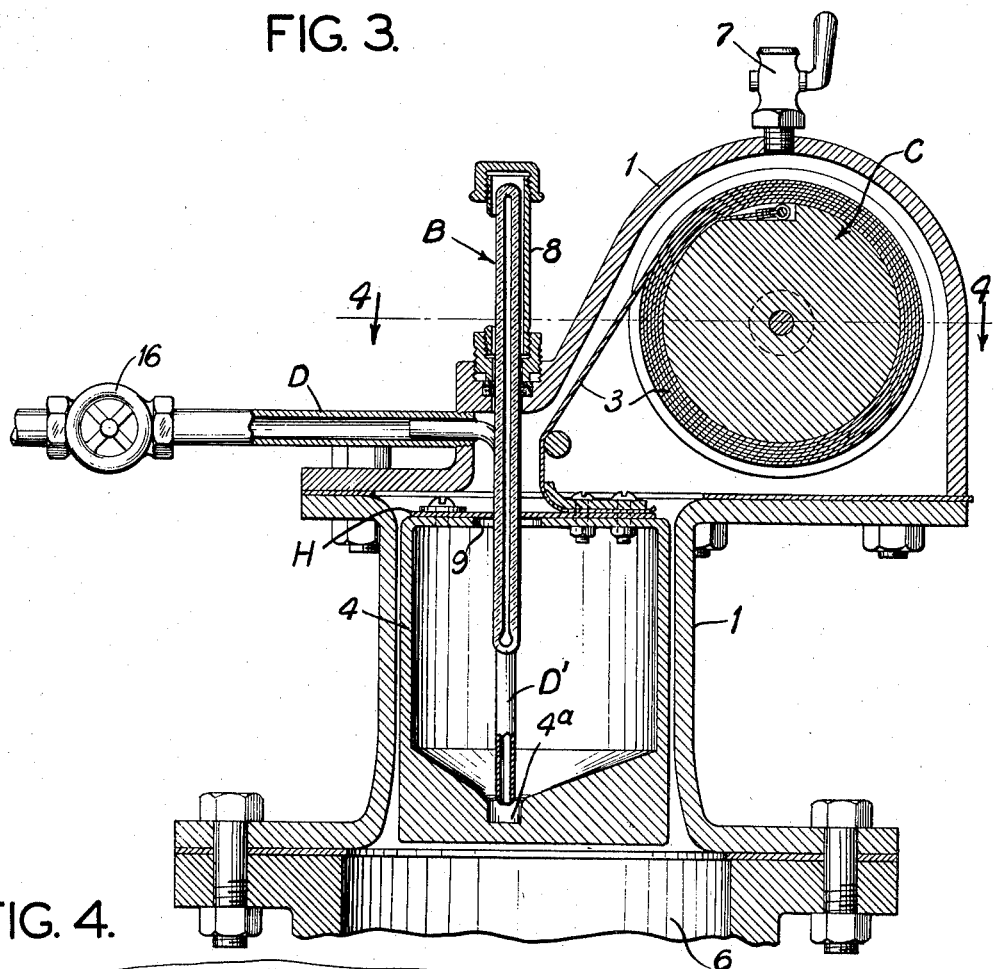
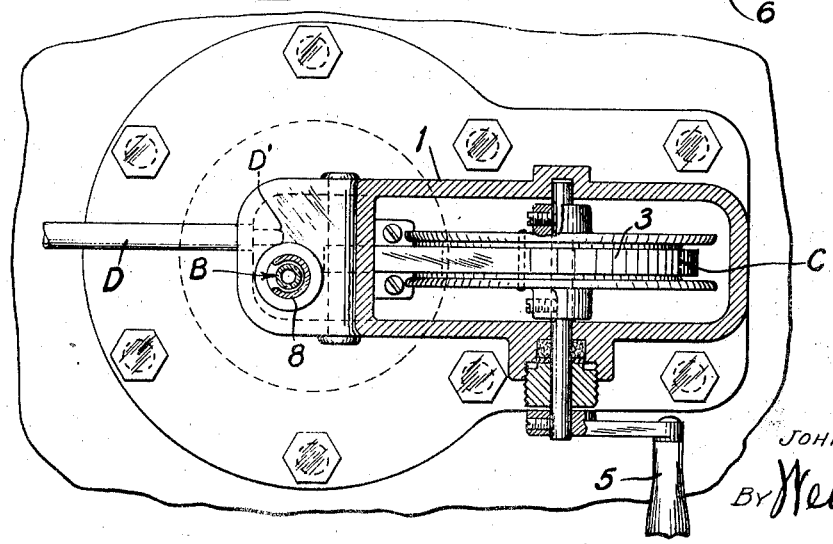

Patented Apr. 23, 1940

2,198,324

UNITED STATES PATENT OFFICE 2,198,324

TEMPERATURE DETERMINING APPARATUS
AND SAMPLER FOR LIQUID CONTAINERS

John H. Wiggins, Chicago, Ill.

Application March 12, 1938, Serial No. 195,483

3 Claims. (Cl. 137—18)

This invention relates to devices and apparatus of the kind that are used to ascertain the temperature of liquid stored in a container, and also devices and apparatus of the kind that are used to obtain a sample of a stored liquid for analyzing or testing the same.

One object is to provide a novel apparatus of simple construction by which the existing temperature at any desired depth or level of liquid stored in a gas-tight container, can be ascertained easily and accurately without exposing the stored liquid to the atmosphere.

Another object is to provide a temperature determining apparatus or means of the kind above referred to in which the temperature indicator is so arranged that the user can read it directly and without the necessity of looking through an intervening window, thereby tending to eliminate errors resulting from difficulties encountered by the user in reading the temperature indicator.

Another object is to provide a temperature determining apparatus, in which the means that is employed to remove the sample from the body of liquid and bring said sample into operative relationship with the temperature indicator, consists of a hollow member provided with a liquid inlet device that accurately regulates or controls the speed at which said hollow member fills with liquid in the operation of submerging said member in the liquid, thereby making it possible to obtain a "spot sample" from any single point of the body of liquid which is truly representative of the liquid at that point.

And still another object of my invention is to provide an apparatus of novel construction, by which a test sample taken from any desired depth or level of a body of liquid stored in a container can be removed easily from the container and conveyed to a laboratory without exposing the contents of the container to the atmosphere and without subjecting the test sample to evaporation loss. Other objects and desirable features of my invention will be hereinafter pointed out.

Briefly described, my broad idea contemplates equipping a liquid container of the closed type with the following elements or devices, namely, (1) a thermometer or equivalent temperature indicator; and (2) a means for enabling a sample to be taken from any desired depth or level of the liquid stored in the container and moved into contact with the thermometer without opening the container or exposing the sample or the contents of the container to the atmosphere. Any desired type or kind of temperature indicator may be employed and various means may be used to remove the sample from the body of stored liquid and move or bring said sample into contact with the temperature indicator. Preferably the thermometer or temperature indicator is mounted on the roof or top of the container in a position where it can be easily observed or read directly by the user without looking through an intervening window, and the means employed to remove the sample from the body of liquid and to bring said sample into contact with the thermometer consists of a small hollow member, referred to for convenience as a "sampler" or "bottle", arranged inside of the container and combined with an operating mechanism by which a person on the exterior of the container can manipulate said operating mechanism, without opening the container, to cause said bottle to be lowered into the liquid to any desired depth or level, the said bottle being provided with a liquid inlet device that controls the rate at which the liquid enters the bottle to constitute a "spot sample" after the bottle reaches the depth or level of the body of liquid from which it is desired to obtain a sample. The operating means is so constructed that after the bottle has become filled with liquid, said bottle can be moved quickly into a position where the thermometer will accurately show the temperature of the sample of liquid contained in the bottle.

In the embodiment of my invention herein illustrated, the operating mechanism above referred to comprises a manually operable reel arranged inside of a gas-tight housing on the roof of the container, and a tape or other suitable flexible element on said reel from which the bottle hangs plumb, the thermometer or temperature indicator being preferably mounted on said housing in such a manner that a portion of said thermometer is located on the exterior of said housing so as to facilitate reading of the thermometer, and a portion of said thermometer is arranged on the interior of the housing in a position where it will project into or be submerged in the sample in the bottle after said bottle has been moved upwardly into said housing by manipulating the reel to which the tape is attached.

In order that the sample confined in the bottle may be removed from same and conveyed to a laboratory for a test or analysis, I have provided the apparatus with a means of novel construction by which said sample can be discharged from said bottle into a portable sealed carrier without liability of exposing the contents of the container to the atmosphere and without liability of subjecting said sample to evaporation loss. Preferably, the means just referred to comprises an eduction pipe mounted on the reel housing in such a way that a terminal portion of said pipe will be submerged in the sample in the bottle after said bottle has been brought into operative relationship with the thermometer, a portable carrier removably combined with said eduction pipe by an air and gas-tight connection, with control valves that are adapted to be manipulated so as to cause a positive or minus pressure, capable of being created or produced in numerous ways, to force the sample out of the bottle through said eduction pipe into the portable carrier, and thereafter seal the sample in said carrier and cut off communication between the eduction pipe and the atmosphere when the carrier is disconnected from the eduction pipe preparatory to transporting said carrier to the testing laboratory.

Figure 1 of the drawings is a vertical sectional view of a liquid storage container equipped with my improved temperature determining apparatus and sampler, the portable carrier and a portion of the reel housing being shown in section.

Figure 2 is an enlarged horizontal sectional view taken on the line 2—2 of Figure 1.

Figure 3 is a vertical sectional view on an enlarged scale of the reel housing and the parts associated with same.

Figure 4 is a horizontal sectional view taken on the line 4—4 of Figure 3; and

Figure 5 is a vertical sectional view illustrating a modification of my invention.

In the drawings A designates a closed or gas-tight container that is used for storing or holding liquid $x$. My improved apparatus comprises a temperature indicator B, such as a thermometer, mounted on or combined with the container A in such a manner that the graduations of said thermometer can be read from the exterior of the container, and a means for taking a sample from any desired depth or level of the body of liquid $x$ in the container and moving or bringing said sample into such relationship with the thermometer B that said thermometer will accurately show the temperature of said sample. Preferably, the means just referred to comprises a manually operable reel C rotatably mounted in a gas-tight housing 1 positioned on the roof or top of the container A in vertical alignment with an opening 2 in said roof, a tape or other flexible element 3 that is adapted to be wound onto and unwound from the reel C and a small hollow member 4, hereinafter referred to as a bottle, that hangs plumb from the tape 3 and which is constructed in such a way that when it is submerged in or lowered into the liquid $x$ by turning the reel C, said bottle will automatically fill with liquid when the bottle is stopped or brought to rest at the particular depth or level of which it is desired to determine the temperature. The reel C is provided with an operating handle 5 arranged on the exterior of the reel housing as shown in Figure 1, and the reel housing may be attached directly to the top or roof of the container A or it may be mounted upon a vertically disposed sleeve or collar on said roof equipped with a valve, indicated in broken lines in Figure 1 that can be closed under certain conditions as hereinafter described. At the top or upper end of the reel housing 1 is a cock or valve 7 that can be opened as hereinafter described so as to establish communication between the atmosphere and the interior of the reel housing.

The temperature indicator B, which preferably consists of a long-stem thermometer, is connected by a gas-tight fitting with the reel housing and is so arranged that when the bottle 4 is drawn upwardly into the reel housing, as shown in Figure 3, the bulb of said thermometer is arranged near the center of gravity of the bottle 4. In order to protect the thermometer B from breakage, it is protected by a metal casing 8 provided with a cut-out which exposes the graduations or temperature readings on the thermometer, said temperature readings beginning at a point above the lower end of the cut-out in the thermometer casing 8 and terminating at a point below the upper end of said cut-out.

The sampler or bottle 4 usually will consist of a hollow cast aluminum member of sufficient weight to insure its traveling downwardly through the liquid in the container A when the tape 3 is unwound from the reel C, the upper portion of said bottle comprising a rigid top or end wall that is provided with an opening 9 for receiving the thermometer B when the bottle 4, with the sample therein, is withdrawn from the liquid $x$ and moved upwardly into the reel housing. The opening 9 just referred to is of considerably greater diameter than the thermometer, as shown in broken lines in Figure 2. In order to control the rate of filling of the bottle in the operation of submerging the same, and in order to prevent the temperature of the sample in the bottle from being effected by the relatively warmer liquid at or adjacent the surface of the body of liquid up through which the bottle 4 passes when said bottle is being moved into operative relationship with the thermometer, I provide said bottle with a liquid inlet device, which, in effect, restricts or cuts down the effective size or area of the relatively large opening 9 in the top of the bottle, without however, interfering with the introduction and withdrawal of the thermometer into and out of the bottle. In the form of my invention herein illustrated the liquid inlet device just referred to is formed by a flexible element or member H that extends over the hole 9 in the rigid top wall of the bottle, said flexible element H having an opening 10 in same (see Figure 2), which is approximately of the same diameter as the bulb portion of the thermometer. In order to insure that the thermometer will freely enter and freely withdraw from the flexible element H, said element is provided with one or more slits 5, as shown in Figure 2. When the apparatus is in use, the liquid inlet device, above referred to, due to the relatively small size of the opening 10 in the flexible element H, permits the bottle to be lowered rapidly to the point from which the sample is to be taken, without danger of the bottle filling with liquid. As soon as the bottle reaches the relatively warmer layer of liquid at the surface of the body of liquid in the container, and the desired point, its downward movement is arrested, whereupon liquid flows into the bottle at a predetermined rate through the inlet device and fills the bottle. Subsequently, when the bottle is withdrawn from the liquid, the flexible element H protects the sample in the bottle from when the bottle enters the reel housing, the element H will flex sufficiently to permit the thermometer to freely penetrate the flexible element H on the top wall of the bottle. By varying the size of the opening 10 in the element H, the rate at which the bottle fills with liquid can be accurately controlled or regulated.

Obviously, any other means than a reel and tape may be used to lower the bottle into the liquid in the container and to withdraw the bottle from the liquid and move the sample into operative relationship with the thermometer, but I prefer the construction herein shown on account of its ease of operation and low cost of manufacture. Usually the reel C will be so dimensioned that one complete revolution of same moves the tape 3 about one foot. Consequently, the user, by counting the revolutions of the reel C, can always tell the approximate position of the bottle 4 with relation to the surface of the liquid x in the container. If desired, the apparatus can be equipped with any suitable kind of a recorder, not shown, for indicating the exact position of the bottle 4 when the apparatus is in use.

The apparatus herein illustrated, in addition to being capable of being used for determining the temperature at any particular depth or level of a body of liquid stored in a container, is also constructed in such a way that it can be employed for taking a sample of liquid stored in a gas-tight container and then transferring said sample to a portable carrier in which the sample is conveyed to a laboratory for analysis or testing purposes without exposing the contents of the container to the atmosphere and without subjecting the test sample to evaporation loss. The means by which this highly desirable result is attained consists of an eduction pipe D connected by a gas-tight fitting to the reel housing 1 and provided with a terminal portion D', shown in Figure 3, arranged inside of the reel housing in such a manner that when the bottle 4 with the sample therein is moved upwardly out of the liquid into the reel housing the terminal portion D' of the eduction pipe will penetrate a hole 10a in the flexible element H at the upper end of the bottle 4, located at one side of the hole 10 previously described, and thus become positioned in the bottle 4 when said bottle reaches its uppermost position, shown in Figure 3. The bottom of the bottle 4 is imperforate but is made substantially funnel-shaped so as to form in effect a sump 4a that receives the extreme lower end of the terminal portion D' of the eduction pipe when the bottle is positioned in the reel housing. The eduction pipe D projects laterally from the reel housing and is attached to a T fitting E that is provided with two valves 11 and 12, the downwardly projecting leg of said T fitting E having a threaded portion 13 so as to permit a carrier F to be detachably connected to same in a gas and air-tight condition said carrier F being provided at its upper end with a fitting equipped with a valve 14 and provided at its lower end with a fitting that is also equipped with a valve 15. The eduction pipe D is provided at a point between the reel housing and the T fitting E with a valve 16.

In using the apparatus above described, the operator turns the handle 5 of the reel C so as to lower the bottle 4 into the liquid in the container A, counting the turns of the reel during the lowering operation if it is desired to obtain a sample at a certain depth or level of the body of liquid. During the operation of lowering the bottle, the operator can tell by the feel of the reel handle when the bottle reaches the surface of the liquid in the container and thereafter he starts counting the number of revolutions made by the reel until the bottle reaches the depth or level at which the sample is to be taken. After the bottle has reached the desired level or depth, the reel is stopped and held at rest until the bottle 4 fills with liquid. The rate of filling, of course, will depend upon the size of the holes 10 and 10a in the flexible element H that partially closes the hole 9 in the top wall of the bottle, but usually said holes will be so proportioned that the bottle will fill in about sixty seconds. The rate of filling is immaterial, however, and may be varied to suit existing conditions. There have been instances where I have found it to be desirable to have the bottle fill in 250 seconds against the lowering time of 5 seconds, which ratio would produce a "spot sample" approximately 98% accurate, which is far above the requirement for a "spot sample" from a practical standpoint. After sufficient time has elapsed to insure that the bottle has become filled, the reel C is rotated in the reverse direction so as to move the bottle rapidly upwardly through the liquid. As previously stated, when the bottle 4 is moving upwardly out of the liquid in the container, the flexible element H that partially closes the opening 9 in the rigid top wall of the bottle, tends to prevent the sample in the bottle from being affected by the relatively higher temperature that exists at the surface of the body of liquid. During the upward movement of the bottle, just before it starts to enter the reel housing, the operator reduces the speed of the reel so as to cause the bottle to travel at a relatively slow speed at the time the thermometer starts to enter the bottle. As soon as the sample in the bottle has come in contact with the thermometer, the thermometer will start registering the temperature of the sample and when the thermometer stops changing, the operator reads it and thus ascertains the temperature of the sample, the speed with which the sample was withdrawn from the body of liquid in the container and moved into operative relationship with the thermometer being so short that the reading on the thermometer will be the true temperature of the liquid at the level or depth from which the sample was taken.

If it is desired to analyze or test the sample contained in the bottle 4, the operator proceeds as follows:

First, he fills the carrier F with water and attaches said carrier to the threaded portion 13 of the depending leg of the T fitting E on the eduction pipe D, the valves 14 and 15 of the carrier being then closed. Generally there is sufficient gas pressure in the container A to force the liquid out of the bottle 4 and discharge said liquid through the eduction pipe D if the valve 16 in said pipe be opened. Assuming that there is sufficient pressure in the container A to do this, the operator opens the valve 16 in the eduction pipe and the valve 11 in the T fitting E so that all of the trapped air or gases will escape to the atmosphere through valve 11. The air or gas in the eduction pipe D is now replaced by liquid from the bottle 4. Thereafter, the valve 11 is closed and the valves, 12, 14 and 15 are opened, thus causing the liquid to pass from the eduction pipe D into the carrier F and displace the water therein which escapes through the valve 15 at the lower end of the carrier. After all of the water has been discharged from the carrier or when the liquid that was previously in the bottle 4 starts to flow from the valve 15 at the lower end of the carrier F, the operator closes the valve 15 for he knows that at that time the carrier F is filled with the liquid that is to be analyzed or tested. Thereafter, the valve 14 at the upper end of the carrier is closed and the carrier is disconnected from the threaded portion 13 of the depending leg on the T fitting E and is conveyed to the testing laboratory.

To prepare the apparatus for another operation, all of the liquid is blown out of the bottle 4 after which the valve 16 in the eduction pipe is closed so as to cut off communication between the atmosphere and interior of the reel housing. For greater accuracy of temperature all portions of the reel housing may be insulated but for ordinary work this is unnecessary as the thermometer reacts so quickly that the temperature error should be less than one-fourth of a degree.

In case there is no pressure in the container A, there are two ways of discharging the sample from the bottle 4 into the carrier F in which the sample is conveyed to the testing laboratory. If the reel housing is mounted on a sleeve 6 provided with a valve as previously mentioned, the valve in said sleeve may be shut after the bottle 4, with the sample therein, has been drawn upwardly into the reel housing so as to produce a relatively small closed chamber. The valve 7 at the upper end of the reel housing is then opened and air is then blown into said housing through the valve 7 so as to create a pressure of a few inches of water. Thereafter the procedure previously described can be practiced so as to utilize the air that was blown into the reel housing through the valve 7 to exert pressure on the sample in the bottle 4 and cause said sample to be discharged through the eduction pipe D. An alternative procedure is to open the valves 16 and 11 and exert a suction on the valve 11 so as to withdraw all of the air from the eduction pipe D and cause said pipe to be filled with liquid that is drawn up into same from the bottle 4 by the suction exerted on the valve 11. Then close the valve 11 and open the valves 12, 14 and 15. If the carrier F was filled with water preparatory to attaching it to the T fitting E, the water will escape from said carrier upon opening of the valve 15 thereby creating a syphon which causes the sample in the bottle 4 to pass into the carrier F.

It is immaterial whether the bottle 4 is maintained inside of the reel housing or is left submerged in the liquid in the container A when the apparatus is not in use, it being possible to hold the bottle 4 at any desired level simply by tightening the stuffing box in the side wall of the reel housing that surrounds the reel shaft to which the operating handle 5 is attached.

In Figure 5 of the drawings I have illustrated a modification of my invention, wherein the reel housing is mounted directly upon the roof of the container A instead of upon a sleeve 6 provided with a valve as previously described, and the bottle or sampler is so constructed that after it has been charged with a sample of liquid, said bottle can be moved into a position wherein it acts as a valve to cut off communication between the container and the reel housing and thus produce a relatively small closed chamber in which pressure can be created in the manner previously explained, in case there is not sufficient pressure in the container A to discharge the sample through the eduction pipe that leads to the carrier F. In this form of my invention the reel housing 1a is attached directly to the roof of the container A and the sampler or bottle 4a is provided adjacent its lower end with a valve portion 17 that is adapted to coact with a ground valve seat 18 on the reel housing 1a as shown in Figure 5 when the sampler is in its fully raised position. With such an apparatus, if the internal pressure of the container is not above atmosphere, the bottle 4a, after being charged with a sample, can be moved upwardly into the position shown in Figure 5 so as to cause the valve portion 17 and valve seat 18 to coact with each other to cut off communication between the interior of the container and the portion of the reel housing in which the sampler is located. Thereafter a positive or minus pressure can be created in the reel housing in the way previously explained in describing the apparatus illustrated in Figure 3, so as to cause the sample to pass from the bottle 4a through the eduction pipe into the carrier F. In instances where the internal pressure of the container A is above atmosphere, the internal pressure of the container can be used to discharge the sample from the bottle 4a into the eduction pipe, if the said bottle is drawn upwardly into the reel housing and set in such a position that the valve portion 17 will not bear tightly against the valve seat 18.

It has heretofore been an unsatisfactorily solved problem to obtain a sample from a gas-tight container without opening the container and exposing the contents of same, more or less, to the atmosphere. Devices have heretofore been proposed which were constructed so as to bring a sampler out of a container, through a lock, but even in such devices some of the gas from the container escaped to the surrounding atmosphere and in instances where such gases were of a poisonous nature, as for example, the gases contained in sour crude petroleum, the gases constituted a great hazard to the gager or operator.

Devices for reading the temperature of a sampler through a glass enclosed chamber have also been suggested but they have not proved satisfactory on account of condensation and frost which accumulates on the inside of the glass chamber. My invention overcomes the inherent defects or objections of prior devices that have heretofore been used or suggested for sampling liquid confined in a gas-tight container as the apparatus herein illustrated, which represents the preferred form of my invention, is of such construction or design that it permits a sample of liquid to be removed from a gas-tight container and conveyed to a testing laboratory without liability of exposing the contents of the container to the atmosphere, without liability of subjecting the operator or gager to danger, and without liability of subjecting the sample to evaporation loss.

Having thus described my invention, what I claim as new and desire to secure by Letters Patent is:

1. A liquid container of the closed type, provided with a thermometer arranged so that a portion of same is located in a zone that communicates with the interior of the container, a sampler, means operable from the exterior of the container for lowering said sampler into the liquid in the container to obtain a sample from a certain point or level of the body of liquid and thereafter move said sampler into a position where said thermometer will indicate the temperature of the sample in the sampler, and a liquid inlet on said sampler constructed so as to tend to prevent liquid from readily entering the sampler while the sampler is being lowered through the liquid and to permit the liquid to readily enter the sampler after the sampler has reached the point from which the sample is to be taken.

2. A liquid container of the closed type, provided with a thermometer arranged so that a portion of same is located in a zone that communicates with the interior of the container, a hollow sampler, means operable from the exterior of the container for submerging said sampler in the liquid in the container to charge the same with a sample of liquid and thereafter move said sampler into a position where said thermometer will indicate the temperature of the sample in the sampler, and a liquid inlet device in the top of the sampler for causing the sampler to fill with liquid at a predetermined rate, said liquid inlet device comprising a flexible element having a perforation that receives the thermometer when the sampler is brought into operative relationship with the thermometer.

3. In a liquid storage apparatus, the combination of a container for holding the liquid, a sampler, a space in which said sampler is adapted to be positioned after said sampler has been charged with a sample of the liquid confined in the container, a passageway through which the sample can be discharged from the sampler into a carrier arranged on the exterior of the container, and a valve portion on said sampler that cuts off communication between the interior of the container and the space in which the sampler is positioned, when the sampler comes to rest in said space.

JOHN H. WIGGINS.

CERTIFICATE OF CORRECTION.

Patent No. 2,198,324. April 23, 1940.

JOHN H. WIGGINS.

It is hereby certified that error appears in the printed specification of the above numbered patent requiring correction as follows: Page 2, second column, lines 61 and 62, strike out the words "the relatively warmer layer of liquid at the surface of the body of liquid in the container, and" and insert the same before "when" in line 69; and that the said Letters Patent should be read with this correction therein that the same may conform to the record of the case in the Patent Office.

Signed and sealed this 6th day of August, A. D. 1940.

(Seal)

Henry Van Arsdale,
Acting Commissioner of Patents.